US012739332B2

(12) United States Patent
Yoshida

(10) Patent No.: US 12,739,332 B2
(45) Date of Patent: Sep. 15, 2026

(54) IMAGE PROCESSING APPARATUS, METHOD FOR CONTROLLING IMAGE PROCESSING APPARATUS, AND STORAGE MEDIUM

(71) Applicant: CANON KABUSHIKI KAISHA, Tokyo (JP)

(72) Inventor: Hiroyoshi Yoshida, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 146 days.

(21) Appl. No.: 18/773,048

(22) Filed: Jul. 15, 2024

(65) Prior Publication Data

US 2024/0372952 A1 Nov. 7, 2024

Related U.S. Application Data

(63) Continuation of application No. 18/303,416, filed on Apr. 19, 2023, now Pat. No. 12,069,214, which is a continuation of application No. 17/173,675, filed on Feb. 11, 2021, now Pat. No. 11,659,111, which is a continuation of application No. 15/907,091, filed on Feb. 27, 2018, now Pat. No. 10,951,782, which is a continuation of application No. 14/610,943, filed on Jan. 30, 2015, now Pat. No. 9,936,088.

(30) Foreign Application Priority Data

Feb. 3, 2014 (JP) ................................ 2014-018268

(51) Int. Cl.
*H04N 1/00* (2006.01)
*H04N 1/21* (2006.01)

(52) U.S. Cl.
CPC ..... *H04N 1/00517* (2013.01); *H04N 1/00389* (2013.01); *H04N 1/00395* (2013.01); *H04N 1/00411* (2013.01); *H04N 1/00474* (2013.01); *H04N 1/00482* (2013.01); *H04N 1/00506* (2013.01); *H04N 1/21* (2013.01); *H04N 2201/0094* (2013.01)

(58) Field of Classification Search
USPC ........................................................ 358/1.15
See application file for complete search history.

(56) References Cited

U.S. PATENT DOCUMENTS

2006/0171513 A1* 8/2006 Yoshida ............ H04N 1/00432 379/88.13

* cited by examiner

*Primary Examiner* — Jacky X Zheng
(74) *Attorney, Agent, or Firm* — Canon U.S.A., Inc. IP Division

(57) ABSTRACT

An image processing apparatus for executing a plurality of applications associated with specific functions to perform image processing includes a first registration unit that, when executing any one of the plurality of applications, automatically registers first setting data set for the application in a storage unit in association with the application, a second registration unit that, according to a registration instruction from a user, registers second setting data set for any one of the plurality of applications in association with the application, and a display control unit that displays a calling-up and setting screen including a first button group for calling up the first setting data automatically registered in the storage unit and a second button group for calling up the second setting data registered in the storage unit.

10 Claims, 15 Drawing Sheets

FIG.4A

| | BUTTON ID | APPLICATION ID | ACTION ID | DISPLAY TXT |
|---|---|---|---|---|
| 1201 | BUTTON ID | APPLICATION ID | ACTION ID | DISPLAY TXT |
| 1202 | 0001 | 404 | 0001 | "CONTRACT DOCUMENT FOR TRANSMISSION" |
| 1203 | 0002 | 403 | 0001 | "CONTRACT DOCUMENT STORAGE MANAGEMENT UNIT DB" |
| 1204 | 0003 | 402 | 0001 | "LUNCH PARTY HANDOUT" |
| 1205 | 0004 | 403 | 0002 | "CONTRACT DOCUMENT FOR STORAGE" |
| 1206 | 0005 | 0000 | 0000 | "" |
| 1207 | 0006 | 402 | 0002 | "MEETING HANDOUT" |
| 1208 | 0007 | 0000 | 0000 | "" |
| 1209 | 0008 | 0000 | 0000 | "" |
| 1210 | 0009 | 0000 | 0000 | "" |

FIG.4B

| | APPLICATION ID | ICON |
|---|---|---|
| 1211 | APPLICATION ID | ICON |
| 1212 | 402 | |
| 1213 | 403 | |
| 1214 | 403 | |

FIG.5A

| | BUTTON ID | APPLICATION ID | ACTION ID | DISPLAY TXT |
|---|---|---|---|---|
| 1101 | | | | |
| 1102 | 1001 | 403 | 0003 | yoshida@caxxn.co.jp |
| 1103 | 1002 | 402 | 0003 | "15 COPIES, TWO-SIDED, STAPLING" |
| 1104 | 1003 | 402 | 0004 | "MONOCHROME, 2in1" |

FIG.5B

| | BUTTON ID | APPLICATION ID | ACTION ID | DISPLAY TXT |
|---|---|---|---|---|
| 1105 | 1001 | 402 | 0003 | "15 COPIES, TWO-SIDED, STAPLING" |
| 1106 | 1002 | 402 | 0003 | "MONOCHROME, 2in1" |
| 1107 | 1003 | 402 | 0004 | "3 COPIES, 4in1" |

FIG.12A

| ACTION ID | SETTING DATA | | | | |
|---|---|---|---|---|---|
| | VALUE | COLOR | TWO-SIDED | STAPLING | PAGE AGGREGATION |
| 0000 | 1 | COLOR | ONE-SIDED | NONE | NONE |
| 0001 | 20 | COLOR | TWO-SIDED | SPECIFIED | NONE |
| 0002 | 15 | MONOCHROME | TWO-SIDED | SPECIFIED | 2in1 |
| 0003 | 15 | COLOR | TWO-SIDED | NONE | NONE |
| 0004 | 1 | MONOCHROME | ONE-SIDED | NONE | NONE |
| 0005 | 0 | MONOCHROME | ONE-SIDED | NONE | NONE |
| 0006 | 0 | MONOCHROME | ONE-SIDED | NONE | NONE |
| 0007 | 0 | MONOCHROME | ONE-SIDED | NONE | NONE |
| 0008 | 0 | MONOCHROME | ONE-SIDED | NONE | NONE |
| 0009 | 0 | MONOCHROME | ONE-SIDED | NONE | NONE |
| 0010 | 0 | MONOCHROME | ONE-SIDED | NONE | NONE |

| ACTION ID | SETTING DATA | | | | |
|---|---|---|---|---|---|
| | DESTINATION | COLOR | TWO-SIDED | FORMAT | MIXED ORIGINALS |
| 0000 | 1 | COLOR | ONE-SIDED | PDF | NONE |
| 0001 | ¥¥kanridb¥keiyaku¥ | COLOR | TWO-SIDED | PDF | SPECIFIED |
| 0002 | yoshida@caxxn.co.jp | MONOCHROME | TWO-SIDED | PDF | SPECIFIED |
| 0003 | yoshida@caxxn.co.jp | COLOR | TWO-SIDED | NONE | NONE |
| 0004 | 0 | MONOCHROME | ONE-SIDED | NONE | NONE |
| 0005 | 0 | MONOCHROME | ONE-SIDED | NONE | NONE |
| 0006 | 0 | MONOCHROME | ONE-SIDED | NONE | NONE |
| 0007 | 0 | MONOCHROME | ONE-SIDED | NONE | NONE |
| 0008 | 0 | MONOCHROME | ONE-SIDED | NONE | NONE |
| 0009 | 0 | MONOCHROME | ONE-SIDED | NONE | NONE |
| 0010 | 0 | MONOCHROME | ONE-SIDED | NONE | NONE |

| ACTION ID | SETTING DATA | | |
|---|---|---|---|
| | DESTINATION | TWO-SIDED | MIXED ORIGINALS |
| 0000 | 1 | ONE-SIDED | NONE |
| 0001 | 0312345678 | TWO-SIDED | SPECIFIED |
| 0002 | 0 | TWO-SIDED | SPECIFIED |
| 0003 | 0 | TWO-SIDED | NONE |
| 0004 | 0 | ONE-SIDED | NONE |
| 0005 | 0 | ONE-SIDED | NONE |
| 0006 | 0 | ONE-SIDED | NONE |
| 0007 | 0 | ONE-SIDED | NONE |
| 0008 | 0 | ONE-SIDED | NONE |
| 0009 | 0 | ONE-SIDED | NONE |
| 0010 | 0 | ONE-SIDED | NONE |

| ACTION ID | SETTING DATA | | | | |
|---|---|---|---|---|---|
| | VALUE | COLOR | TWO-SIDED | STAPLING | PAGE AGGREGATION |
| 0000 | 1 | COLOR | ONE-SIDED | NONE | NONE |
| 0001 | 20 | COLOR | TWO-SIDED | SPECIFIED | NONE |
| 0002 | 15 | MONOCHROME | TWO-SIDED | SPECIFIED | 2in1 |
| 0003 | 15 | COLOR | TWO-SIDED | NONE | NONE |
| 0004 | 1 | MONOCHROME | ONE-SIDED | NONE | NONE |
| 0005 | 3 | COLOR | ONE-SIDED | NONE | 4in1 |
| 0006 | 0 | MONOCHROME | ONE-SIDED | NONE | NONE |
| 0007 | 0 | MONOCHROME | ONE-SIDED | NONE | NONE |
| 0008 | 0 | MONOCHROME | ONE-SIDED | NONE | NONE |
| 0009 | 0 | MONOCHROME | ONE-SIDED | NONE | NONE |
| 0010 | 0 | MONOCHROME | ONE-SIDED | NONE | NONE |

| ACTION ID | SETTING DATA | | | | |
|---|---|---|---|---|---|
| | DESTINATION | COLOR | TWO-SIDED | FORMAT | MIXED ORIGINALS |
| 0000 | 1 | COLOR | ONE-SIDED | PDF | NONE |
| 0001 | ¥¥kanridb¥keiyaku¥ | COLOR | TWO-SIDED | PDF | SPECIFIED |
| 0002 | yoshida@caxxn.co.jp | MONOCHROME | TWO-SIDED | PDF | SPECIFIED |
| 0003 | yoshida@caxxn.co.jp | COLOR | TWO-SIDED | NONE | NONE |
| 0004 | 0 | MONOCHROME | ONE-SIDED | NONE | NONE |
| 0005 | 0 | MONOCHROME | ONE-SIDED | NONE | NONE |
| 0006 | 0 | MONOCHROME | ONE-SIDED | NONE | NONE |
| 0007 | 0 | MONOCHROME | ONE-SIDED | NONE | NONE |
| 0008 | 0 | MONOCHROME | ONE-SIDED | NONE | NONE |
| 0009 | 0 | MONOCHROME | ONE-SIDED | NONE | NONE |
| 0010 | 0 | MONOCHROME | ONE-SIDED | NONE | NONE |

IMAGE PROCESSING APPARATUS, METHOD FOR CONTROLLING IMAGE PROCESSING APPARATUS, AND STORAGE MEDIUM

CROSS-REFERENCE TO RELATED APPLICATIONS

This application is a Continuation of U.S. patent application Ser. No. 18/303,416, filed Apr. 19, 2023, which is a Continuation of U.S. patent application Ser. No. 17/173,675, filed Feb. 11, 2021, now U.S. Pat. No. 11,659,111, which is a Continuation of U.S. patent application Ser. No. 15/907,091, filed Feb. 27, 2018, now U.S. Pat. No. 10,951,782, which is a Continuation of U.S. patent application Ser. No. 14/610,943, filed Jan. 30, 2015, now U.S. Pat. No. 9,936,088, which claims the benefit of Japanese Patent Application No. 2014-018268, filed Feb. 3, 2014, all of which are hereby incorporated by reference herein in their entirety.

BACKGROUND

Field

Aspects of the present invention generally relate to an image processing apparatus, a method for controlling the image processing apparatus, and a storage medium.

Description of the Related Art

A certain image processing apparatus executes a plurality of applications to perform various kinds of data processing. Such an image processing apparatus is provided with a function of storing setting data corresponding to applications that have been executed by a user. Japanese Patent Application Laid-Open No. 8-292864 discusses a user interface for automatically setting default values for each application and application customization processing.

A large majority of users of image processing apparatuses uses a small number of setting patterns for applications to be executed. Particularly for each application, a user needs to reset patterns each time although the user uses less number of setting patterns.

Although setting registration functions (default value change, custom menu, mode memory, etc.) are proposed to avoid pattern setting each time, the user does not bother to register settings.

Meanwhile, Japanese Patent Application Laid-Open No. 8-292864 discusses a method for predicting a user's intention to save the user the trouble of registering settings for applications. With this method, however, the user may not grasp settings registered to an image processing apparatus.

SUMMARY

Aspects of the present invention are generally directed to providing a mechanism for simultaneously displaying setting data automatically registered in the course of execution of each application and setting data set for each application by a user. This enables the user to conveniently select setting data to be executed.

According to an aspect of the present invention, an image processing apparatus for executing a plurality of applications associated with specific functions to perform image processing includes a first registration unit configured to, when executing any one of the plurality of applications, automatically register first setting data set for the any one of the plurality of applications in a storage unit in association with the application, a second registration unit configured to, according to a registration instruction, register second setting data set for any one of the plurality of applications in association with the any one of the plurality of applications, and a display control unit configured to display on a display unit a calling-up and setting screen including a first button group for calling up the first setting data automatically registered in the storage unit and a second button group for calling up the second setting data registered in the storage unit.

According to the present disclosure, it is possible to display setting data automatically registered in the course of execution of each application and setting data set for each application by a user in an identical calling-up and setting screen, enabling the user to conveniently select setting data to be executed.

Further features of the present disclosure will become apparent from the following description of exemplary embodiments with reference to the attached drawings.

BRIEF DESCRIPTION OF THE DRAWINGS

FIGS. 4A and 4B illustrate a table for managing registration data.

FIGS. 5A and 5B illustrate management data for buttons displayed on the display unit.

FIGS. 12A, 12B, 12C, 12D, and 12E illustrate tables for managing registered setting data.

DESCRIPTION OF THE EMBODIMENTS

Various exemplary embodiments will be described in detail below with reference to the drawings.

<Descriptions of System Configuration>

Figure 1:
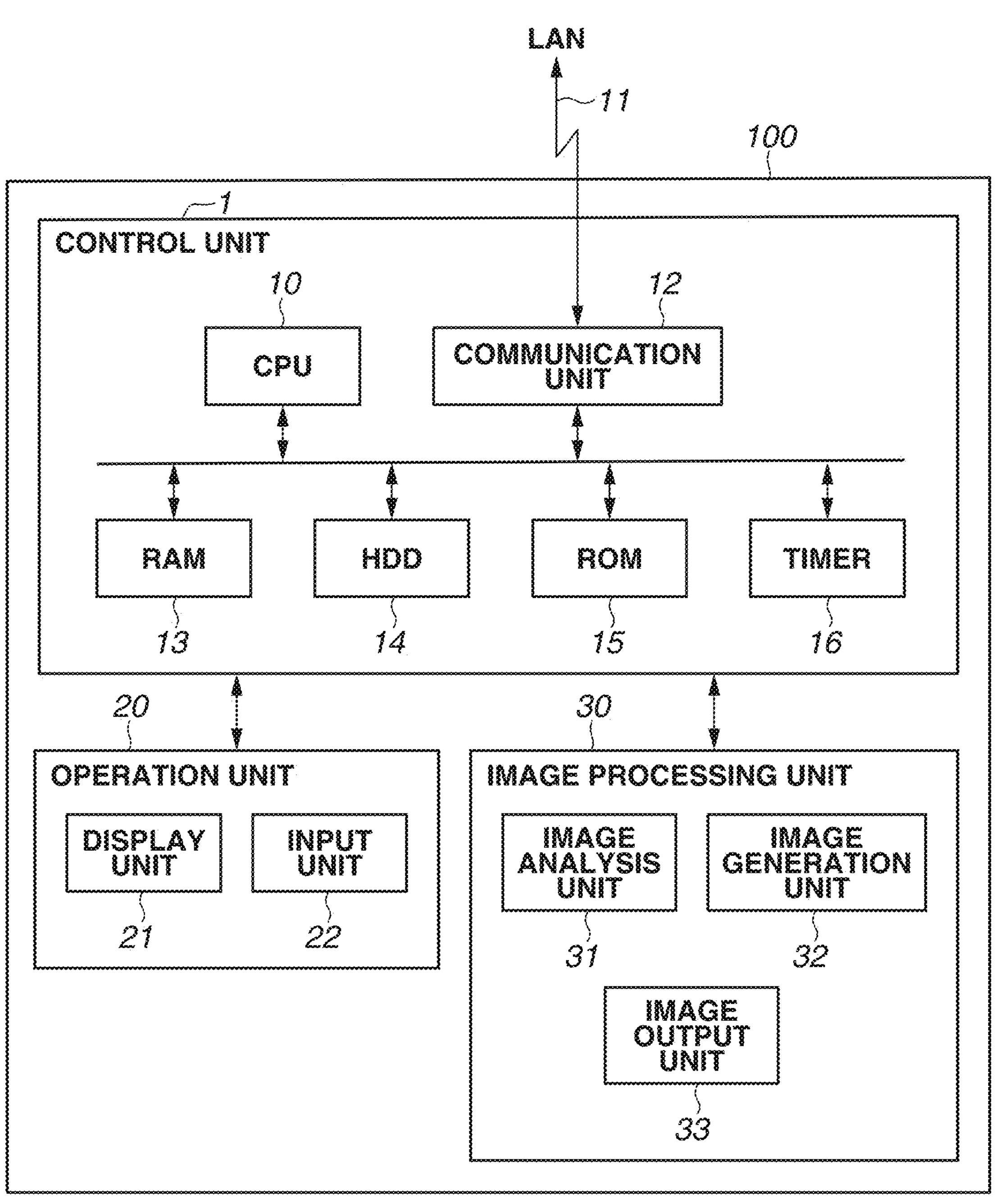
FIG. 1 is a block diagram illustrating a configuration of an image processing apparatus.

FIG. 1 is a block diagram illustrating a configuration of an image processing apparatus according to a first exemplary embodiment. In the present exemplary embodiment, as an image processing apparatus for executing a plurality of applications associated with specific functions to perform image processing, the image processing apparatus is provided with the plurality of applications. The image processing apparatus according to the present exemplary embodiment is, for example, a multifunction peripheral (MFP) capable of executing a copy application, a facsimile application, and an E-mail application. More specifically, specific functions executable by applications include a print function, a copy function, a facsimile function, and an E-mail function.

Referring to FIG. 1, a control unit 1 controls operations of each unit of an MFP 100. The control unit 1 includes a central processing unit (CPU) 10, a local area network (LAN) 11, a communication unit 12, a random access memory (RAM) 13, a hard disk drive (HDD) 14, and a read-only memory (ROM) 15. The CPU 10 controls the entire control unit 1. The LAN 11 is a network for enabling the MFP 100 to exchange data with external apparatuses. The MFP 100 is connected to the Internet via the LAN 11.

The communication unit 12 transmits and receives data via the LAN 11. The RAM 13 provides a system work memory necessary for operations of the CPU 10. The HDD 14 may be a storage medium such as a magnetic disk, an optical medium, and a flash memory.

The HDD 14 is configured to store in a table format (described below) document data and setting data associated with each application. The HDD 14 does not need to be included in the MFP 100. An external server or a personal computer (PC) may be used as a storage apparatus via the communication unit 12. The ROM 15 is a boot ROM which stores a boot program of a system. The CPU 10 loads a program installed in the HDD 14 into the RAM 13 by using the boot program in the boot ROM (ROM 15), and performs various control based on the loaded program. The HDD 14 further includes a specific area for managing a button group (an automatically registered button group) displayed in a specific area in a recall portal screen 300 (described below). The relevant specific area is used as a first-in first-out (FIFO) area.

A timer 16 performs timing processing according to an instruction of the CPU 10. When a specified time interval has elapsed, the timer 16 notifies the CPU 10 of the relevant passage of time as an interruption.

An operation unit 20 is controlled by the control unit 1, and includes a display unit 21 and an input unit 22. The display unit 21 is used to display information about the MFP 100 to a user. The input unit 22 receives an input from the user via an interface, such as a touch panel, a mouse, a camera, an audio input, and a keyboard.

The display unit 21 displays a user interface (UI) screen (described below) to receive settings from the user.

An image processing unit 30 is controlled by the control unit 1, and includes an image analysis unit 31, an image generation unit 32, and an image output unit 33. The image analysis unit 31 analyzes the structure of a document image, and extracts necessary information from an analysis result. The image generation unit 32 reads a document (for example, by scanning the document), converts an image of the document into image data in digital form, and stores the image data in the HDD 14.

The image generation unit 32 can also generate document image data in another format by using the information analyzed by the image analysis unit 31. The image output unit 33 outputs the image data stored in the HDD 14. The image data can be output, for example, by printing the document image data on paper, by transmitting via the communication unit 12 the document image data to an external device, a server, a facsimile, etc. connected to the network, or by storing the document image data in a storage medium connected to the MFP 100.

Figure 2:
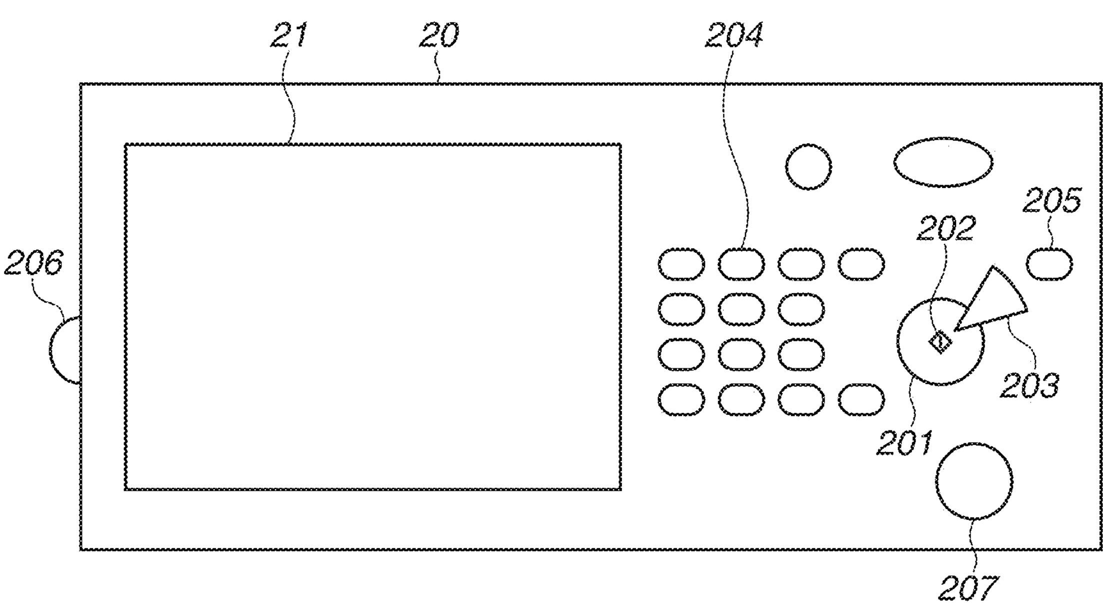
FIG. 2 is a plan view illustrating an operation unit illustrated in FIG. 1.

FIG. 2 is a plan view illustrating the operation unit 20 illustrated in FIG. 1.

Referring to FIG. 2, the display unit 21 according to the present exemplary embodiment is a liquid crystal display (LCD) unit composed of a touch-panel sheet stuck on a liquid crystal panel. The display unit 21 displays an operation screen and soft keys. When a displayed key is pressed by a user operation, the display unit 21 transmits relevant positional information to the CPU 10. In this case, therefore, the display unit 21 also functions as the input unit 22.

Various keys and buttons operated by the user will be described below.

A start key 201 is used to instruct to start a document read operation. Two (green and red) light emitting diodes (LEDs) 202 are provided at the center of the start key 201 to indicate whether the start key 201 is usable or not. A stop key 203 is used to stop the current operation. A numeric keypad 204 includes numeric and character buttons, and is used to instruct to set the number of copies or to change the screen of the display unit 21. A user mode key 205 is pressed to set the MFP 100.

A recall portal screen according to the present exemplary embodiment will be described below.

Figure 3:
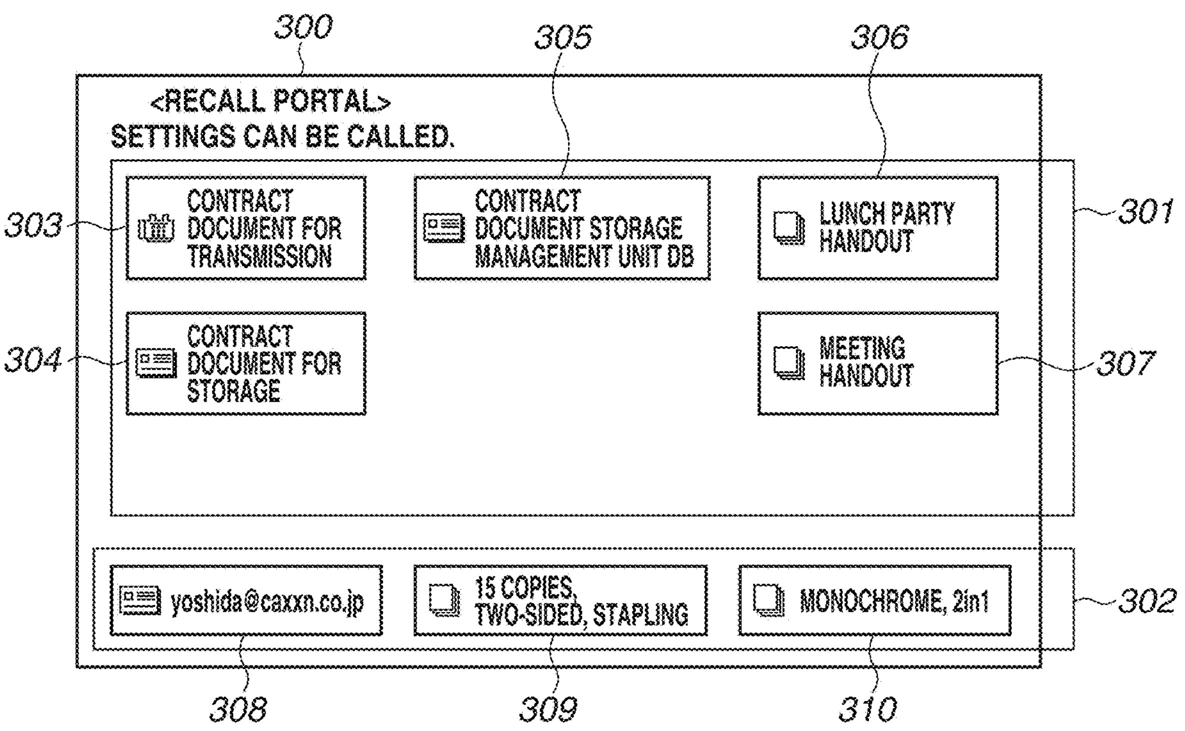
FIG. 3 illustrates an example of a user interface (UI) screen displayed on a display unit.

FIG. 3 illustrates an example of a UI screen displayed on the display unit 21 illustrated in FIG. 2. This example screen is an example of a recall portal screen. The UI screen controls display so that button groups (described below) are arranged in respective division areas.

Referring to FIG. 3, a recall portal screen 300 includes a fixed setting area 301 registered by a user's explicit instruction, and a recall setting area 302 registered by a recall function (described below) during job execution.

In the present exemplary embodiment, the CPU 10 performs control to display fixed settings in the fixed setting area 301 and display recall settings in the recall settings display area 302, allowing the user to easily identify each area. Buttons 303 to 307 are pressed to call up setting data to be fixedly preset by the user in setting screens (described below) illustrated in FIGS. 7A and 7B according to a user's registration instruction. Buttons 308 to 310 are associated with setting data that has been automatically set by a recall portal 401 illustrated in FIG. 6 according to the present exemplary embodiment. In particular, the button 308 is pressed to automatically set a specific mail address "yoshida@ca . . . " as a destination in setting data associated with an E-mail application 403 in FIG. 6. The button 309 is pressed to select the number of copies "15", two-sided printing, stapling, etc. in setting data associated with a copy application 402 in FIG. 6.

The button 310 is pressed to select monochrome printing and 2in1 in setting data associated with the copy application 402. Processing (registration and deletion) for setting data subjected to automatic registration will be described below. In the present exemplary embodiment, buttons are displayed in different areas, and shapes of buttons to be displayed are differentiated to allow the user operating the relevant UI screen to perform button operations with sufficient visibility.

When the recall portal screen 300 is activated, the recall portal screen 300 first reads a fixed registration data management table 1201 illustrated in FIG. 4A to display the fixed setting area 301. Subsequently, the recall portal screen 300 sequentially calls up entries 1202 to 1210 in this order. Each time the recall portal screen 300 calls up an entry, the CPU 10 refers to an application identifier (ID). When the application ID is "0000", the CPU 10 performs control not to display the corresponding button on the display unit 21. On the other hand, when the application ID is not "0000", the CPU 10 performs control to display a display text (display TXT) on the corresponding button.

Then, the CPU 10 performs control to search for an entry having the same application ID stored in an application icon table 1211 illustrated in FIG. 4B, and to display the relevant icon at a predetermined position of the corresponding button displayed on the display unit 21.

In the recall portal screen 300, the CPU 10 processes the entire fixed registration data management table 1201 illustrated in FIG. 4A. Then, to display recall settings in the recall settings display area 302, the CPU 10 reads a recall data management table 1101 illustrated in FIG. 5A.

The recall portal screen 300 sequentially reads entry 1102 and subsequent entries. Each time the recall portal screen 300 calls up an entry, the CPU 10 refers to the application ID. When the application ID is "0000", the CPU 10 performs control not to display the corresponding button. On the other hand, when the application ID is not "0000", the CPU 10 performs control to display a display TXT on the corresponding button.

Then, the CPU 10 performs control to search for an entry having the same application ID stored in the application icon table 1211 illustrated in FIG. 4B, and display the relevant icon at a predetermined position of the corresponding button.

Thus, the CPU 10 can display the UI screen illustrated in FIG. 3 on the display unit 21 by using the recall data management table 1101 illustrated in FIG. 5A and the fixed registration data management table 1201 illustrated in FIG. 4A.

Hereinafter, to simplify descriptions, all of the fixed settings are collectively referred to as fixed settings 301S in connection with the fixed setting area 301. Similarly, all of the recall settings are collectively referred to as recall settings 302S in connection with the recall settings display area 302.

In the present exemplary embodiment, button shapes for the fixed settings 301S are differentiated from button shapes for the recall settings 302S to allow the user to visually identify each area based on button shapes.

Each of the buttons for the fixed settings 301S displays the icon of an application to be activated by pressing the relevant button, and a button name input by the user. The button name is input to a button specified in a user setting registration screen (described below) by the user. Unregistered buttons are not displayed.

Meanwhile, for each of the buttons for the recall settings 302S, the CPU 10 performs control to display the icon for an application to be activated by pressing the relevant button, and a text expressing the summary of the setting generated by display TXT generation (refer to step S606 in FIG. 8) (described below). The buttons for the recall settings 302S are generated and deleted by recall data registration processing (described below) executed by the CPU 10.

Figure 6:
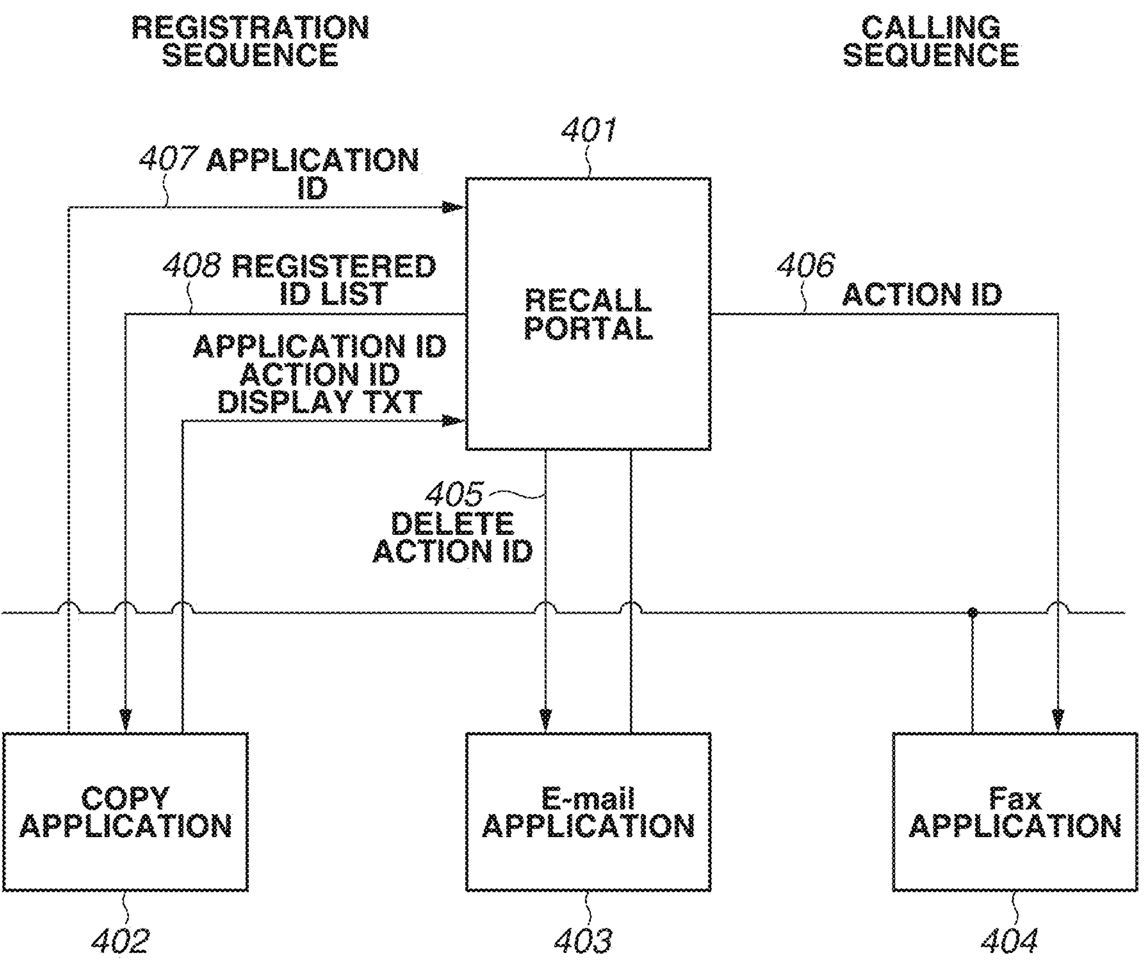
FIG. 6 illustrates a configuration of applications.

FIG. 6 illustrates a configuration of applications in the image processing apparatus according to the present exemplary embodiment. The present exemplary embodiment corresponds to an application registration sequence. Each application is executed by the CPU 10 to perform corresponding data processing.

Referring to FIG. 6, the recall portal 401, a kind of application, operates in conjunction with other applications such as the copy application 402, the E-mail application 403, and a Fax application 404.

Each application can be identified by the application ID, and stores data described in a recall data registration configuration and a setting data management table (described below).

When a button displayed on the operation unit 20 is pressed, the recall portal 401 calls up recall data according to the button, and transmits a relevant action ID to the application ID (refer to a notification 406). An application specified by the application ID reads setting data according to the received action ID, and sets the setting data. Needless to say, any kind of application can be specified as long as it is capable of exchanging the above-described setting data.

Figure 7A:
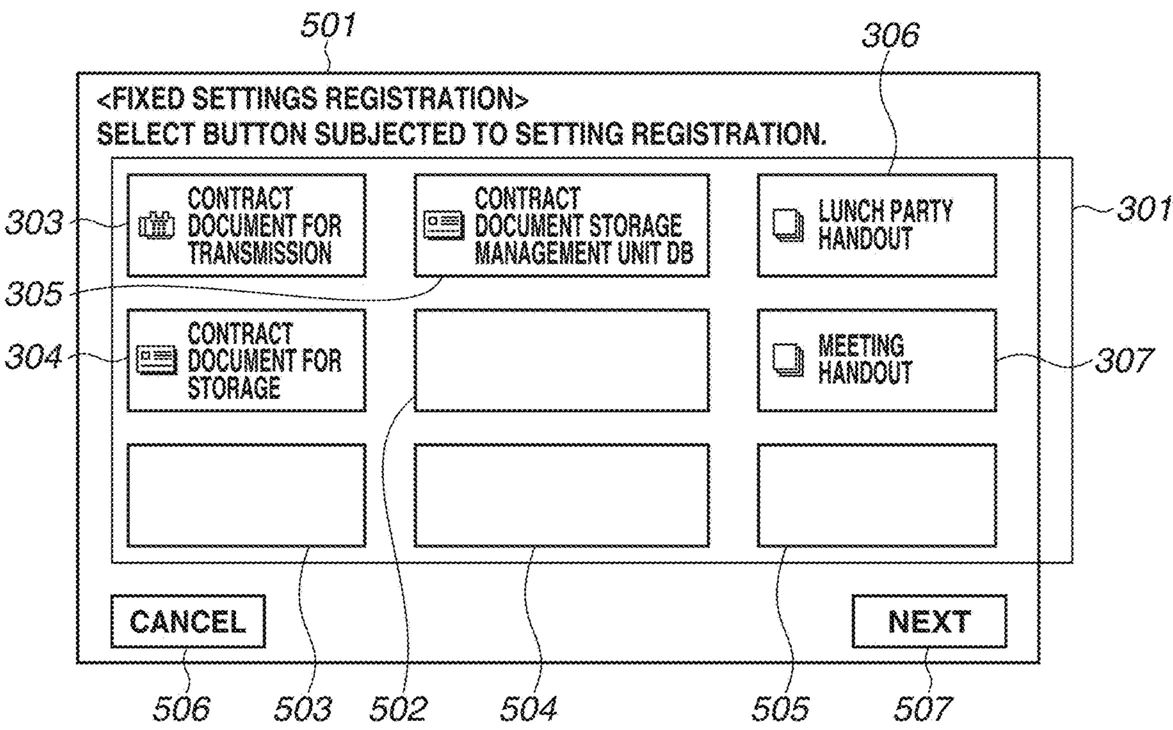
FIGS. 7A and 7B illustrate examples of user interfaces displayed on the display unit.
Figure 7B:
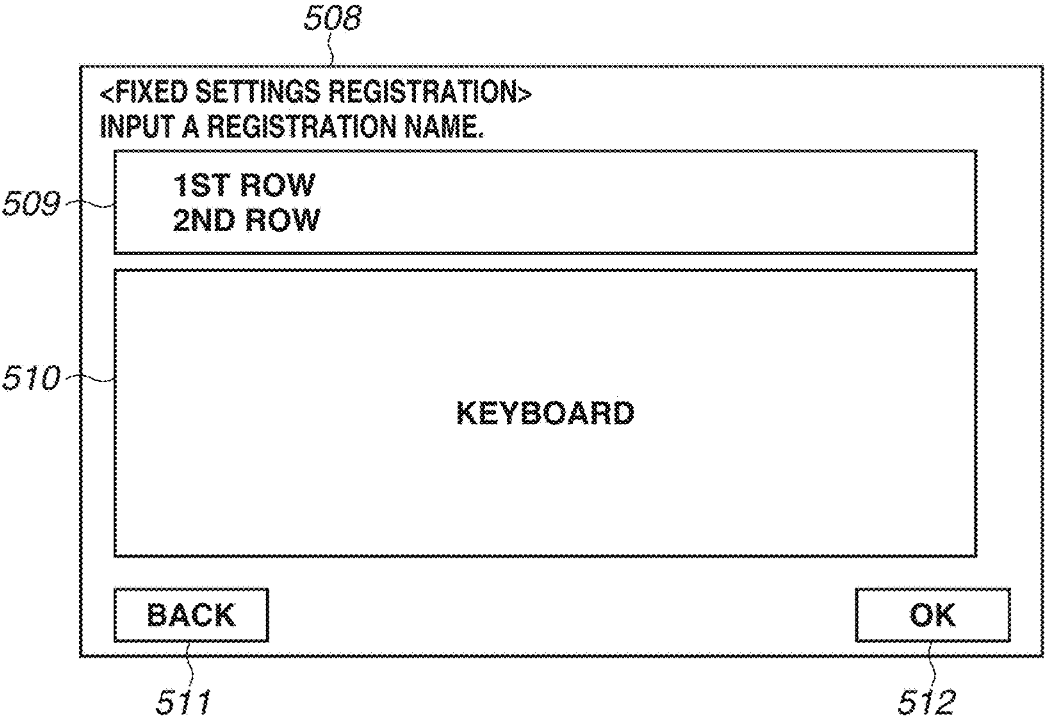

FIGS. 7A and 7B illustrate examples of user interfaces displayed on the display unit 21 illustrated in FIG. 1. These example screens are examples of the user setting registration screens.

Referring to FIG. 7A, a fixed setting registration screen 501 includes the fixed setting area 301 having a similar configuration to the configuration of the recall portal screen 300. The fixed setting area 301 of the fixed setting registration screen 501 differs from that of the recall portal screen 300 in that unregistered buttons 502, 503, 504, and 505 are displayed and that any button in the fixed setting area 301 is selected only by pressing it.

A Cancel button 506 is used to cancel data registration, and a Next button 507 is used to display the following fixed setting registration screen 508.

The fixed setting registration screen 508 illustrated in FIG. 7B is used to input a text to be displayed on each button.

The fixed setting registration screen 508 includes an area 509 for confirming the contents of an input text, and a keyboard (software keyboard) 510 for inputting characters. Pressing a Back button 511 displays the fixed setting registration screen 501 illustrated in FIG. 7A. Pressing an OK button 512 completes registration procedures.

An example case where the following new job is executed by the copy application 402 illustrated in FIG. 6 will be described in detail below with reference to FIGS. 6 to 12E. The new job is executed in a state where the UI screen illustrated in FIG. 3 is displayed on the display unit 21.

[Example of a New Job]

A job setting is a setting of {3 copies, color copy, one-sided printing, 4in1}.

The image output unit 33 illustrated in FIG. 1 includes an engine for printing a color image on one side or on both sides of a sheet. The image output unit 33 is further provided with an Nin1 function for laying out a plurality of pages on one page and printing the page via the image generation unit 32, where N is an integer (2, 4, 6, or 9).

Although the present exemplary embodiment will be described below based on the copy application 402 as an example, the copy application 402 may be replaced with the E-mail application 403, the Fax application 404, or any other applications capable of exchanging data illustrated in FIG. 4.

Figure 8:
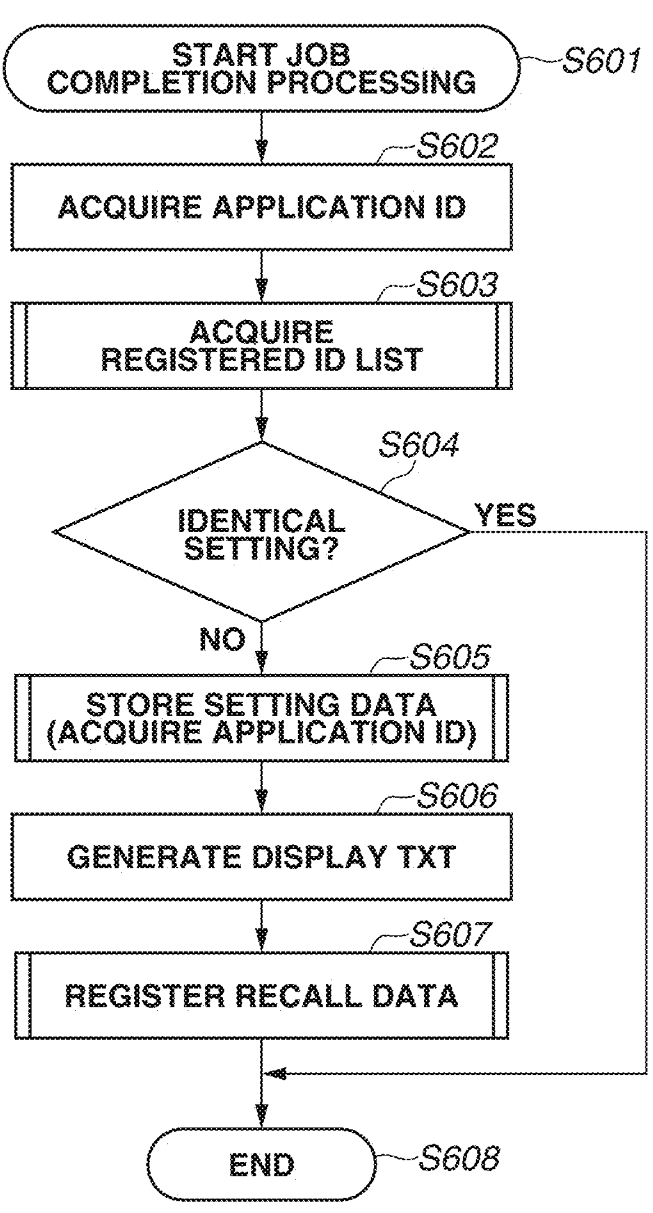
FIG. 8 is a flowchart illustrating a method for controlling the image processing apparatus.
Figure 9:
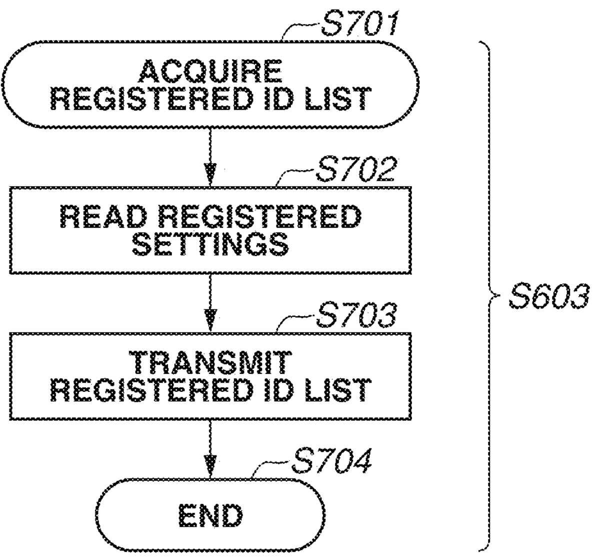
FIG. 9 is a flowchart illustrating a method for controlling the image processing apparatus.
Figure 10:
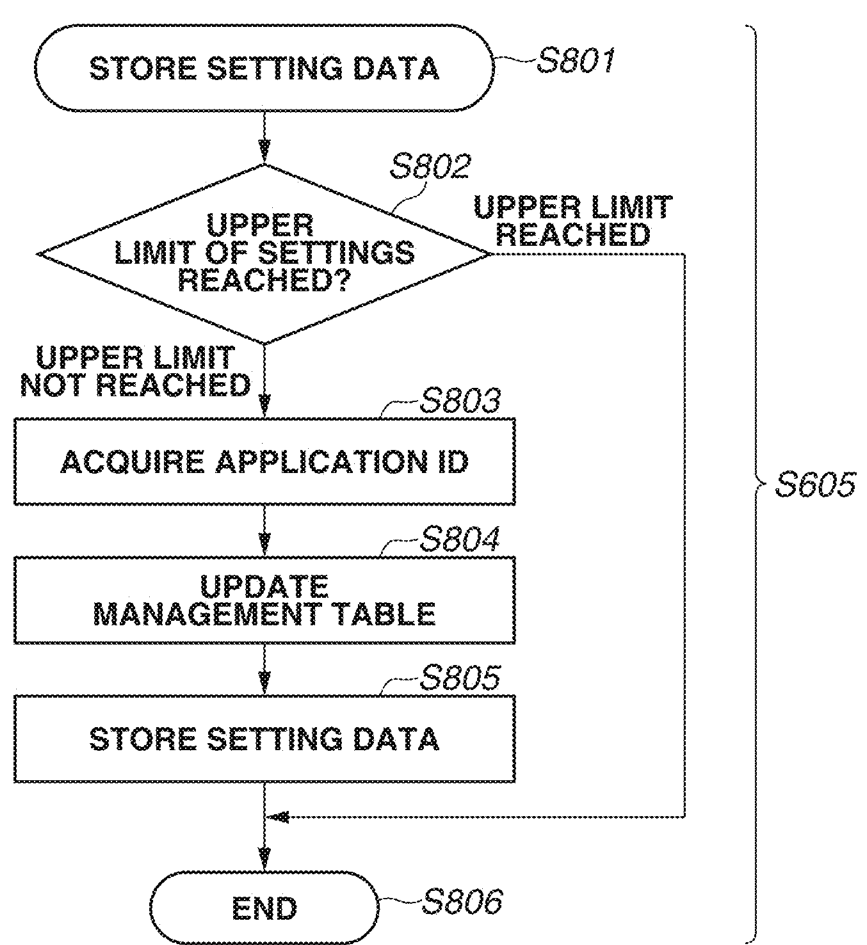
FIG. 10 is a flowchart illustrating a method for controlling the image processing apparatus.
Figure 11:
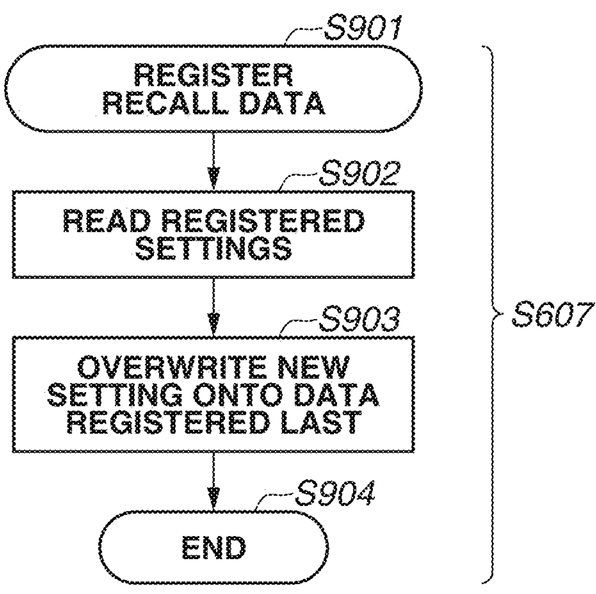
FIG. 11 is a flowchart illustrating a method for controlling the image processing apparatus.

FIGS. 8 to 11 are flowcharts illustrating data processing methods performed by the image processing apparatus according to the present exemplary embodiment. FIG. 8 is a flowchart illustrating an example of job completion processing of an application. FIGS. 9, 10, and 11 are flowcharts corresponding to detailed procedures of steps S603, S605, and S607 illustrated in FIG. 8, respectively.

More specifically, the flowchart illustrated in FIG. 9 corresponds to registered ID list acquisition processing performed by the recall portal 401. The flowchart illustrated in FIG. 10 corresponds to setting data storage processing of an application. The flowchart illustrated in FIG. 11 corresponds to recall data registration processing performed by the recall portal 401. Each step of the flowcharts illustrated in FIGS. 8 to 11 is implemented when the CPU 10 loads and executes a control program stored in the HDD 14.

FIGS. 12A to 12E illustrate examples of setting data management tables for applications managed by the HDD 14 illustrated in FIG. 1.

In step S601, when the copy application 402 completes job execution, the recall portal 401 starts job completion processing. In step S602, when the recall portal 401 starts the job completion processing, the recall portal 401 first acquires an application ID. In this case, the recall portal 401 starts processing corresponding to step S701 in FIG. 9 in which the recall portal 401 acquires the application ID of the copy application 402.

More specifically, in step S703, the copy application 402 transmits the application ID to a registered ID list acquisition routine of the recall portal 401 (refer to a request 407 illustrated in FIG. 6). In step S603, the copy application 402 acquires action IDs already registered by the copy application 402 itself.

To be more precise, when the recall portal 401 starts processing in step S701 illustrated in FIG. 9, in step S702, the recall portal 401 reads settings for the copy application 402 already registered by the recall portal 401 itself. In step S703, the recall portal 401 transmits a registered ID list (described in detail below) to the copy application 402 which is a requestor. In step S704, the recall portal 401 exits this processing routine. In step S603, the copy application 402 as a requestor acquires the registered ID list.

In step S604, the recall portal 401 reads setting data corresponding to the action ID acquired from the copy application 402, and searches for the setting data registered in the HDD 14 to determine whether the read setting data is identical to the currently executed setting data. When the recall portal 401 determines that the read setting data is identical to the currently executed setting data (YES in step S604), then in step S608, the recall portal 401 ends the job completion processing without performing the recall data registration processing.

In the present exemplary embodiment, on the other hand, when the recall portal 401 determines that the read setting data is not identical to the currently executed setting data (NO in step S604), then in step S605, the recall portal 401 invokes a setting data storage processing routine (refer to FIG. 10) of the copy application 402 (described below), stores setting data 1018 illustrated in FIG. 12D (refer to steps S802 to S805 for details), and acquires "action ID=0005". In step S606, the recall portal 401 generates a display text (display TXT) based on the currently executed setting data. In step S607, the recall portal 401 transmits the action ID and the generated display TXT to the recall data registration processing (refer to steps S901 to 904 illustrated in FIG. 11) of the recall portal 401 (described below), and exits this processing routine.

Upon reception of a registered ID list acquisition request 407 from the copy application 402 as illustrated in FIG. 6, the recall portal 401 starts the registered ID list acquisition routine (steps S701 to S704).

Referring to the registered ID list acquisition started in step S701 illustrated in FIG. 9, in step S702, the recall portal 401 collects action IDs of data having the application ID of the requestor from the recall data management table 1101 illustrated in FIGS. 5A and 5B and the fixed registration data management table 1201 illustrated in FIG. 4A. In step S703, the recall portal 401 returns the action IDs to the copy application 402 as a requestor. In step S704, the recall portal 401 exits this processing routine.

In the present exemplary embodiment, the registered ID list is a list of {0001, 0002, 0003, 0004}.

Referring to the job completion processing started in step S601 illustrated in FIG. 8, in step S605, the recall portal 401 invokes a setting data storage routine (refer to steps S801 to S806 illustrated in FIG. 10).

More specifically, in step S801, the recall portal 401 starts the setting data storage processing. In step S802, the recall portal 401 determines whether an upper limit of settings is reached. The recall portal 401 makes such determination, for example, based on whether there is any unused entry.

In this case, the recall portal 401 determines whether there is any unused entry based on whether the first item of an entry is "0". When the recall portal 401 determines that there is no unused entry (Upper Limit Reached in step S802), then in step S806, the recall portal 401 exits this processing routine.

For example, in the case of the example illustrated in FIG. 12A, an entry 1007 is unused. Therefore, the recall portal 401 determines that the upper limit of settings is not reached (Upper Limit Not Reached in step S802), then in step S803, the recall portal 401 generates a number for the entry 1007 as an action ID. In step S804, the recall portal 401 updates the relevant entry. In step S805, the recall portal 401 stores the setting data 1018 as illustrated in FIG. 12D. In step S806, the recall portal 401 exits this processing routine.

When a job completion processing routine of the copy application 402 requests to register recall data in step S607 illustrated in FIG. 8, then in step S901 illustrated in FIG. 11, the recall portal 401 starts a recall data registration processing routine.

Referring to the recall data registration processing, in step S902, the recall portal 401 reads registration data from the recall data management table 1101 illustrated in FIGS. 5A and 5B. More specifically, the recall portal 401 reads "application ID=403" and "action ID=0003" of the oldest entry 1102 registered in the recall data management table 1101 illustrated in FIG. 5A. Then, the recall portal 401 notifies the E-mail application 403 having "application ID=403" of the deletion of the registered "action ID=0003" (refer to a notification 405).

Upon reception of the notification 405, the E-mail application 403 deletes the entry 1012 corresponding to "action ID=0003" in the setting data management table 1008 illustrated in FIG. 12B.

Referring to the recall data registration processing illustrated in FIG. 11, the recall portal 401 moves the entry 1102 deleted last and subsequent entries, as illustrated in FIGS. 5A and 5B. Then, in step S903, the recall portal 401 registers the requested "application ID=402", "action ID=0005", and display TXT to an unused entry 1107. In step S904, the recall portal 401 exits this processing routine.

In the second exemplary embodiment, instead of user setting buttons, application activation buttons are arranged on a recall portal screen.

Figure 13:
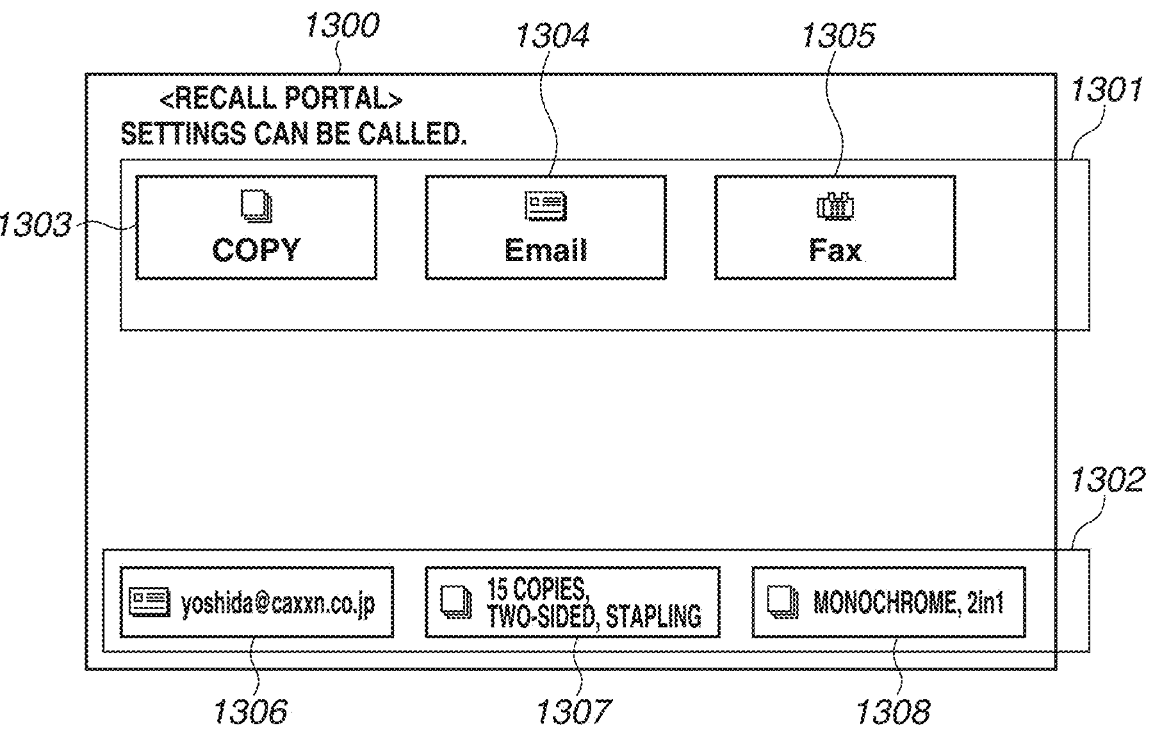
FIG. 13 illustrates an example of a UI screen displayed on the display unit.

FIG. 13 illustrates an example of a UI screen displayed on the display unit 21 illustrated in FIG. 2. This example screen corresponds to a recall portal screen 1300.

Referring to FIG. 13, the recall portal screen 1300 includes a button 1303 for activating the copy application 402, a button 1304 for activating the E-mail application 403, and a button 1305 for activating the Fax application 404 in an application button area 1301. Buttons 1306 to 1308 are equivalent to the buttons 308 to 310 illustrated in FIG. 3.

According to the present exemplary embodiment, a user can arbitrarily select whether to use automatically registered setting data or to execute a user-selected application on the recall portal screen 1300.

Each process of the present exemplary embodiment can be implemented also by executing software (program) acquired via a network or various storage media on a processing apparatus (CPU or processor), such as a personal computer.

The above-described exemplary embodiments are not seen to be limiting and can be modified in diverse ways (including organic combinations of these exemplary embodiments) without departing from the spirit and scope thereof. These modifications are not excluded from the scope of the present disclosure.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

What is claimed is:

1. An information processing apparatus which is capable of executing a plurality of functions including a print function to print image data on a sheet and a predetermined function to process image data and includes a display unit, the information processing apparatus comprising:

one or more processors; and at least one memory storing instructions, which when executed by the one or more processors, cause the information processing apparatus to act as:

a first display control unit configured to display a predetermined screen including a first area including at least a soft key for instructing execution of the print function and a soft key for instructing execution of the predetermined function on the display unit;

a second display control unit configured to, in a case where the soft key for instructing execution of the print function is operated and the print function is executed at a first setting value, display a first button to call the executed print function and the first setting value in a second area different from the first area of the predetermined screen; and a third display control unit configured to, in a case where the soft key for instructing execution of the predetermined function and the predetermined function is executed at a second setting value, display a second button to call the predetermined function executed by the second display control unit and the second setting value in the second area of the predetermined screen where the first button is displayed, wherein the first display control unit displays an image indicating a copy function corresponding to a button for instructing execution of the copy function and an image indicating a second function corresponding to a button for instructing execution of the second function in the first area, the second display control unit displays an image indicating the copy function corresponding to the first button in the second area, and the third display control unit displays an image indicating the second function corresponding to the second button in the second area.

2. The information processing apparatus according to claim 1, wherein in a case where the print function or the predetermined function is executed in a state where a number of predetermined buttons to call an executed function and a setting value, including at least one of the first button and the second button, displayed in the second area has reached an upper limit, any of the predetermined buttons is deleted based on date and time when the predetermined buttons are registered.

3. The information processing apparatus according to claim 2, wherein in the case where the print function or the predetermined function is executed in the state where the number of the predetermined buttons has reached the upper limit, a predetermined button whose date and time when the predetermined button is registered are older than those of the other predetermined buttons among the predetermined buttons is deleted.

4. The information processing apparatus according to claim 1, wherein the first display control unit displays an icon indicating the print function corresponding to the soft key for instructing execution of the print function and an icon indicating the predetermined function corresponding to the soft key for instructing execution of the predetermined function in the first area, the second display control unit displays an icon indicating the print function corresponding to the first button in the second area, and the third display control unit displays an icon indicating the predetermined function corresponding to the second button in the second area.

5. The information processing apparatus according to claim 4, wherein the icon indicating the print function corresponding to the soft key for instructing execution of the print function and the icon indicating the print function corresponding to the first button are the same, and the icon indicating the predetermined function corresponding to the soft key for instructing execution of the predetermined function and the icon indicating the predetermined function corresponding to the second button are the same.

6. The information processing apparatus according to claim 1, wherein the second display control unit displays the first button on the display unit in a case where the soft key for instructing execution of the print function has been operated and the print function has been executed at the first setting value in the information processing apparatus once, and wherein the third display control unit displays the second button on the display unit on which the first button is displayed in a case where the soft key for instructing execution of the predetermined function has been operated and the predetermined function has been executed at the second setting value in the information processing apparatus once.

7. The information processing apparatus according to claim 1, wherein the soft key for instructing execution of the print function and the soft key for instructing execution of the predetermined function are in a first shape, and the first button and the second button are in a second shape different from the first shape.

8. The information processing apparatus according to claim 1, wherein the predetermined function is at least one of a function of transmitting the image data to an external apparatus and a fax function.

9. A method for controlling an information processing apparatus which is capable of executing a plurality of functions including a print function to print image data on a sheet and a predetermined function to process image data and includes a display unit, the method comprising:

first displaying a predetermined screen including a first area including at least a soft key for instructing execution of the print function and a soft key for instructing execution of the predetermined function on the display unit;

in a case where the soft key for instructing execution of the print function is operated and the print function is executed at a first setting value, second displaying a first button to call the executed print function and the first setting value in a second area different from the first area of the predetermined screen; and in a case where the soft key for instructing execution of the predetermined function and the predetermined function is executed at a second setting value, third displaying a second button to call the predetermined function executed in the second displaying and the second setting value in the second area of the predetermined screen where the first button is displayed, wherein the first displaying displays an image indicating a copy function corresponding to a button for instructing execution of the copy function and an image indicating a second function corresponding to a button for instructing execution of the second function in the first area, the second displaying displays an image indicating the copy function corresponding to the first button in the second area, and the third displaying displays an image indicating the second function corresponding to the second button in the second area.

10. A non-transitory computer-readable storage medium storing executable instructions, which when executed by one or more processors of an information processing apparatus which is capable of executing a plurality of functions including a print function to print image data on a sheet and a predetermined function to process image data and includes a display unit, cause the information processing apparatus to perform operations comprising:

first displaying a predetermined screen including a first area including at least a soft key for instructing execution of the print function and a soft key for instructing execution of the predetermined function on the display unit;

in a case where the soft key for instructing execution of the print function is operated and the print function is executed at a first setting value, second displaying a first button to call the executed print function and the first setting value in a second area different from the first area of the predetermined screen; and in a case where the soft key for instructing execution of the predetermined function and the predetermined function is executed at a second setting value, third displaying a second button to call the predetermined function executed in the second displaying and the second setting value in the second area of the predetermined screen where the first button is displayed, wherein the first displaying displays an image indicating a copy function corresponding to a button for instructing execution of the copy function and an image indicating a second function corresponding to a button for instructing execution of the second function in the first area, the second displaying displays an image indicating the copy function corresponding to the first button in the second area, and the third displaying displays an image indicating the second function corresponding to the second button in the second area.

* * * * *